Jan. 23, 1940.   C. B. SUTLIFF   2,188,164
GROUND POTENTIAL COMPENSATOR
Filed Feb. 18, 1939   2 Sheets-Sheet 1
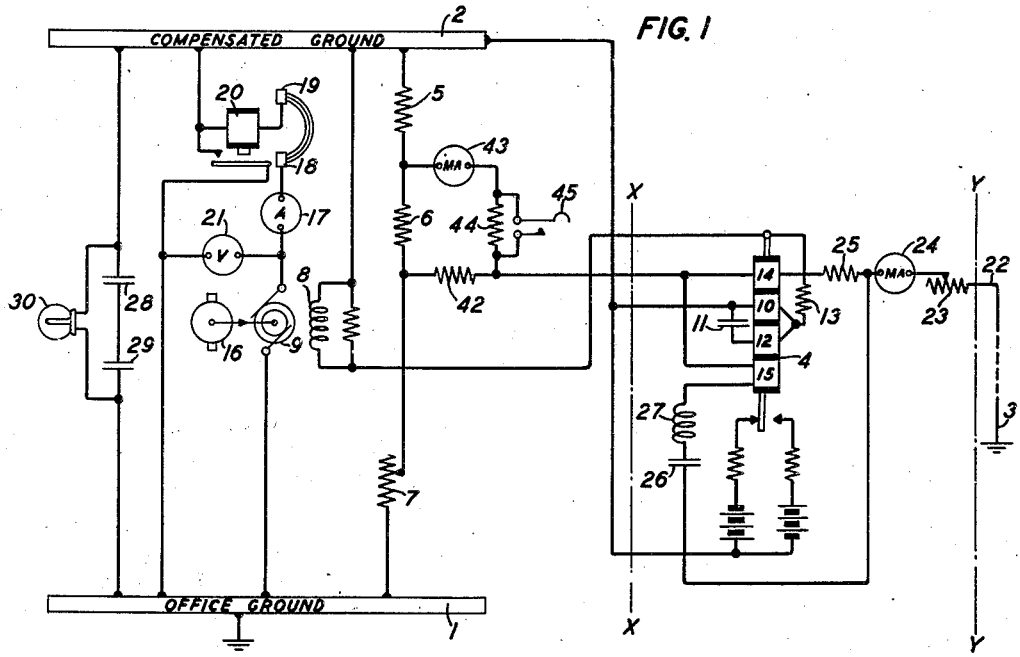
FIG. 1
FIG. 1A
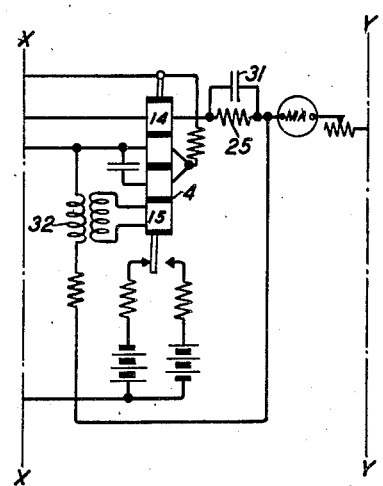
INVENTOR
C. B. SUTLIFF
BY John A. Hall
ATTORNEY Jan. 23, 1940.   C. B. SUTLIFF   2,188,164
GROUND POTENTIAL COMPENSATOR
Filed Feb. 18, 1939   2 Sheets-Sheet 2
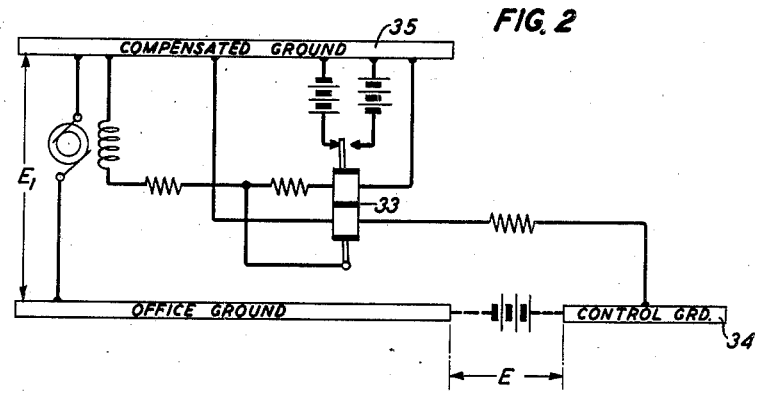
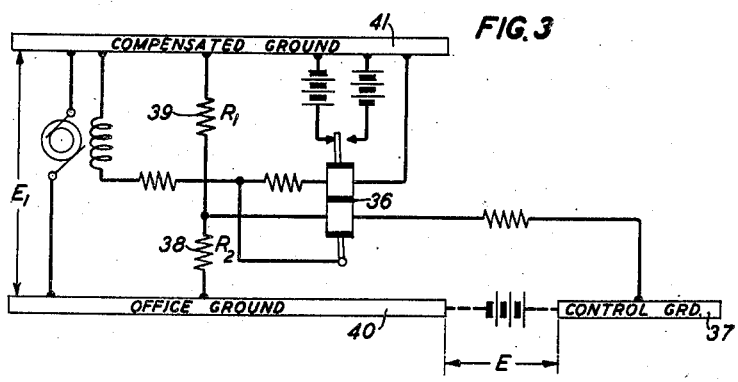
INVENTOR
C.B.SUTLIFF
BY
ATTORNEY Patented Jan. 23, 1940

2,188,164

UNITED STATES PATENT OFFICE 2,188,164

GROUND POTENTIAL COMPENSATOR

Carleton B. Sutliff, East Orange, N. J., assignor to Bell Telephone Laboratories, Incorporated, New York, N. Y., a corporation of New York Application February 18, 1939, Serial No. 257,267

3 Claims. (Cl. 178—69)

This invention relates to ground potential compensating devices, such, for example, as means used in telegraph systems comprising, in general, a generator located in one of the ground connections of the system together with novel control means for that generator.

The object of the invention is to provide simple, reliable and automatically adjustable means for maintaining the potential on the artificial ground connection equal to the potential on a distant ground connection so that at no time will the operation of the system be adversely affected. It is a specific object of the invention to provide means to avoid oscillation or hunting during the automatic adjustment of the compensating generator.

A feature of the invention is a vibrating relay for controlling the output of the compensating generator connected in a circuit involving three terminals, a distant ground connection, a local ground connection and a compensated ground connection. By connecting one terminal of the said controlling relay to a potentiometer circuit extending between the local ground and the compensated ground, it has been found that the compensation can be made immediate and exact and all tendency toward oscillation or hunting before final adjustment may be avoided.

The drawings consist of two sheets, the first of which contains Figs. 1 and 1A. Fig. 1 is a circuit diagram illustrating the invention. In this figure between broken lines X—X and Y—Y is a certain portion which may be altered as shown in Fig. 1A. Fig. 2 is a schematic diagram illustrating the prior art for purposes of more clearly illustrating the novelty of the present invention, shown schematically in Fig. 3.

The essentials of the invention comprise an office ground 1, a compensated ground 2 and a distant ground 3 known as a control ground, with a vibrating relay 4 connected between the distant ground 3 and a point on the potentiometer consisting of resistances 5, 6 and 7 connected between the office ground 1 and the compensated ground 2. The armature of the relay 4 vibrates between contacts connected in plus and minus batteries and affects the field winding 8 of the generator 9 also connected between the office ground 1 and the compensated ground 2.

The vibrating relay 4 for regulating the field 8 of the generator is a well-known device. Its circuit may be traced from compensated ground 2 through the winding 10 and in parallel therewith through a condenser 11 and winding 12, the resistance 13 to the armature and either of its contacts through the plus or minus battery back to the compensated ground 2. When the armature of relay 4 makes contact with either of its contacts the windings 10 and 12 drive it to the opposite position. Windings 14 and 15 are known as biasing windings and if these windings are unaffected then the armature will vibrate between its two contacts in such a manner that the percentage of time it is in connection with one is equal to the percentage of time it is in connection with the other and therefore the net result is that the field coil 8 is unaffected. If the biasing windings 14 and 15 are affected in one direction or the other then the percentage of time the armature is in connection with one contact or the other is changed and the field coil 8 is affected correspondingly.

The generator 9 is driven by a motor 16 and is connected between the office ground 1 and the compensated ground 2 through an ammeter 17 and a circuit breaker comprising contacts 18 and 19 and exciting coil 20. If, due to some extraordinary condition, the exciting coil 20 operates the circuit breaker to open this circuit just traced, it will in the meantime close a contact by its armature to put a direct connection between the office ground 1 and the compensated ground 2 so that telegraph or other circuits connected to the compensated ground will not be entirely disabled.

A voltmeter 21 will indicate the potential of generator 9 and is of a variety to indicate both plus and minus voltages. The ammeter 17 is of the same variety to indicate both plus and minus currents being delivered by the generator 9 to the compensated ground 2.

Since the potential at the distant ground 3 may be quite different from the potential at the office ground 1, a current will flow in the pilot wire 22 through the resistance 23 and milliammeter 24, resistance 25, winding 14 of relay 4 to a point mid-way between the resistance 6 and resistance 7 of the potentiometer connected between the office ground 1 and the compensated ground 2. The value of this current is indicated by the milliammeter 24, which will indicate both plus and minus values. In parallel with resistance 25 and the winding 14 is a circuit comprising condenser 26, inductance 27 and winding 15 of the relay 4. Through the proper adjustment of the values of condenser 26 and inductance 27 this circuit is made resonant to 60 cycles, the usual commercial frequency of electric light and power supply circuits and since winding 15 is poled to oppose winding 14 the relay 4 is unaffected by 60-cycle current which may be picked up at the distant ground 3 or by induction over the pilot wire 22.

The condensers 28 and 29 are of very large capacity and are used to lower the effective impedance of the composite circuit between the compensated ground and the office ground and thus to lower the distortion in the telegraph circuits connected to the compensated ground 2. The lamp 30 indicates a ballast lamp which, under practical conditions, may be a tungsten filament electric lamp having a negative coefficient of resistance. Under the conditions when the generator 9 is not generating any current and there is no difference of potential between the office ground 1 and the compensated ground 2 this lamp offers a path of very low impedance between these grounds.

A milliammeter 43 forms a convenient way of indicating the proper adjustment of the variable resistance 7. With resistances 6 and 42 equal to each other the potentials at the points to which this milliammeter are connected are equal when the resistance 7 is properly adjusted so as to cause this compensator to function and therefore no current will flow. The resistance 44 is a protection to the instrument 43 and may be shunted by the key 45 when nearly perfect adjustment of resistance 7 is reached.

Fig. 1A when fitted into Fig. 1 between the broken lines X—X and Y—Y shows a slightly different arrangement. In this case the resistance 25 is shunted by condenser 31 and the winding 15 poled oppositely to winding 14 of the relay 4 is fed by a transformer 32 instead of being in direct circuit with the pilot wire. The arrangement shown in Fig. 1 is preferable under the condition when a large 60-cycle component is picked up by the pilot wire 22, whereas the arrangement shown in Fig. 1A is preferable when there is severe cross-fire condition to be found on the pilot wire 22.

Fig. 2 is an illustration of the prior art shown in schematic form with only the essential elements illustrated. It will be noted that the vibrating relay 33 has its lower winding connected between the distant control ground 34 and the compensated ground 35. In Fig. 3, illustrating the present invention, the vibrating relay 36 is connected between the distant control ground 37 and a point on a potentiometer comprising resistances 38 and 39 connected between the office ground 40 and the compensated ground 41.

The advantage of the present invention may be explained best in the following manner. The prior art ground potential compensator circuit may be considered as an amplifier provided with feedback. The compensator relay 33 is equipped with a vibrating circuit and a control or biasing winding connected between compensated ground and control ground. The field circuit of the generator is fed from the armature of the relay. When no ground potential exists there is no current in the relay's biasing winding and hence the relay vibrates in an unbiased manner and the unbiased reversals fed to the field circuit have no direct current component. When a ground potential exists current flows in the biasing winding, biasing the relay and thus causing a net field current to flow. This causes a compensating voltage to be generated. Since the biasing winding is connected between compensated ground and control ground the current through it is a function of the potential difference between these two points and thus the effect on the relay is under control of both the ground potential and the generated compensating voltage. In this manner feedback is provided.

It will be seen that given the proper wave shape in the vibrating winding supplied from an external source, the proper generator characteristic, stable battery voltages and a mechanically unbiased relay, compensation could be obtained even though the control or biasing winding of the relay were connected between office ground and control ground. However, any variation of the factors named above would cause the compensation to deviate widely. The feedback circuit makes compensation nearly independent of variables within the compensator circuit.

It will be obvious that unless the relay is of infinite sensitivity compensation will not be exact even with the feedback circuit shown in Fig. 2. For, assume the compensation is exact and assume a ground potential of 50 volts, then the generator will produce a compensating potential of 50 volts and there will be no current in the control winding of the relay. The relay will therefore vibrate in an unbiased manner and will produce no net field current. Hence the generator will produce zero voltage. But we have assumed that the generator is producing 50 volts. Therefore our assumed proposition as to the exactness of the compensation is false.

This may also be shown as follows: Consider the relay and generator as a two-stage amplifier with amplification factor A. This means that when a net voltage of $V_c$ is impressed between the compensated ground and control ground a voltage $AV_c$ will be produced by the generator. In Fig. 2 $V_c = E - E_1$. Hence $E_1 = AV_c = A(E - E_1)$ and $$E_1 = \frac{A}{1+A}E$$

For $E_1$ to equal E, A must be infinite.

The circuit shown in Fig. 3 may be used to improve the compensation. In this circuit $$V_c = E - \frac{E_1 R_2}{R_1 + R_2}$$

Hence $$E_1 = AV_c = A\left(E - \frac{E_1 R_2}{R_1 + R_2}\right)$$

and $$E_1 = \left(\frac{A}{1 + \frac{AR_2}{R_1 + R_2}}\right)E$$

Then if $$\frac{R_2}{R_1} = A - 1, \; E_1 = E$$

and perfect compensation is obtained. In practice, it has been found that this condition can be very nearly approached, slight over-compensation being obtained at some voltages and slight under-compensation at others. The deviation from perfect compensation is probably caused by the variation of A with E due to the non-linear characteristics of the circuit.

The use of the potentiometer also diminishes the gain of the feedback circuit, as will be evident when it is realized that the feedback ceases when $R_2$ is made zero. It has been found that the hunting action of the compensator, which in the prior art circuit occurred at comparatively high frequency and small amplitude, attained an objectionably large amplitude at a low frequency when a large capacity was connected in parallel with the generator armature as a low impedance shunt for 60-cycle interference. When the potentiometer circuit is employed the net gain of the feedback circuit is reduced sufficiently so that hunting is entirely eliminated. The potentiometer above described produces better compensation than was obtained with the prior art circuit.

What is claimed is:

1. A ground potential compensating system comprising a ground connection, a compensated ground connection and a distant ground connection, a generator connected between said ground connection and said compensated ground connection for maintaining said compensated ground connection at the same potential as said distant ground connection, a pilot wire from said distant ground connection to the circuit arrangement at said ground and said compensated ground, and a relay connected between said three ground connections for controlling said generator.

2. A ground potential compensating system comprising a ground connection, a compensated ground connection and a distant ground connection, a generator connected between said ground connection and said compensated ground connection for maintaining said compensated ground connection at the same potential as said distant ground connection, a relay for controlling said generator, said relay being connected between said distant ground connection and an intermediate point on a potentiometer between said ground connection and said compensated ground connection.

3. A ground potential compensating system comprising a ground connection, a compensated ground connection and a distant ground connection, a generator connected between said ground connection and said compensated ground connection for maintaining said compensated ground connection at the same potential as said distant ground connection, a constantly vibrating relay having its armature in connection with one contact for a certain percentage of any given period of time and in connection with another contact for a complementary percentage of such given period of time, said armature being connected to a field winding of said generator so as to affect the output of the said generator in accordance with the said percentages, said relay being connected in a circuit between said distant ground connection and a point in a potentiometer between said ground connection and said compensated ground connection whereby said relay is controlled by the potential of said distant ground connection to correspondingly vary said percentages.

CARLETON B. SUTLIFF.